United States Patent
Tanjo et al.

(10) Patent No.: US 9,847,514 B2
(45) Date of Patent: Dec. 19, 2017

(54) BATTERY AND METHOD FOR MANUFACTURING SAME

(71) Applicant: Automotive Energy Supply Corporation, Zama-shi (JP)

(72) Inventors: Yuji Tanjo, Yokohama (JP); Shinichiro Sakaguchi, Fujisawa (JP)

(73) Assignee: AUTOMOTIVE ENERGY SUPPLY CORPORATION, Zama-shi (JP)

( * ) Notice: Subject to any disclaimer, the term of this patent is extended or adjusted under 35 U.S.C. 154(b) by 168 days.

(21) Appl. No.: 14/221,988

(22) Filed: Mar. 21, 2014

(65) Prior Publication Data

US 2014/0205887 A1   Jul. 24, 2014

Related U.S. Application Data

(63) Continuation of application No. PCT/JP2012/075144, filed on Sep. 28, 2012.

(30) Foreign Application Priority Data

Sep. 29, 2011 (JP) .................................. 2011-214399

(51) Int. Cl.
 *H01M 2/02* (2006.01)
 *H01M 2/10* (2006.01)
 *H01M 10/04* (2006.01)

(52) U.S. Cl.
 CPC .......... *H01M 2/02* (2013.01); *H01M 2/0202* (2013.01); *H01M 2/024* (2013.01);
 (Continued)

(58) Field of Classification Search
 CPC .... H01M 2/02; H01M 2/0202; H01M 2/0237; H01M 2/0212; H01M 2/024;
 (Continued)

(56) References Cited

U.S. PATENT DOCUMENTS

| 4,855,196 A | * | 8/1989 | Eggers | .................. H01M 2/145 29/623.3 |
| 2005/0202311 A1 | * | 9/2005 | Higashino | ........... H01M 2/1077 429/99 |

(Continued)

FOREIGN PATENT DOCUMENTS

| JP | 3-079162 U | 8/1991 |
| JP | 07-302616 A | 11/1995 |

(Continued)

OTHER PUBLICATIONS

NEC (assignee) for patent JP2012-174590. Sep. 2012.*
English machine translation of Yang JP2007-311323.*
Extended European Search Report, Mar. 20, 2015, 7 Pages.

*Primary Examiner* — Lisa S Park
(74) *Attorney, Agent, or Firm* — Foley & Lardner LLP

(57) ABSTRACT

A battery comprising an electrode stacked body that includes a plurality of electrodes and a plurality of separators that are alternately stacked; and a film-made cover member that, by joining mutually overlapped peripheral portions of films, constitute a package for hermetically receiving therein the electrode stacked body, in which the plurality of separators include separators that are flat in shape and larger in size and separators that are flat in shape and smaller in size, and the separators that are flat in shape and larger in size project outward from a side of the electrode stacked body and joined to the films of the film-made cover member at a position inside the mutually joined peripheral portions of the film-made cover member.

12 Claims, 5 Drawing Sheets

(52) U.S. Cl.
CPC ....... *H01M 2/0212* (2013.01); *H01M 2/0237* (2013.01); *H01M 2/1061* (2013.01); *H01M 10/04* (2013.01); *H01M 10/0413* (2013.01); *H01M 2/021* (2013.01); *Y10T 29/49108* (2015.01)

(58) Field of Classification Search
CPC .... H01M 2/1061; H01M 2/021; H01M 10/04; H01M 10/0143; H01M 10/0413; Y10T 29/49108
See application file for complete search history.

(56) References Cited

U.S. PATENT DOCUMENTS

| | | | | |
|---|---|---|---|---|
| 2007/0202394 | A1* | 8/2007 | Viavattine | H01M 2/16 429/144 |
| 2010/0216027 | A1* | 8/2010 | Fujii | H01G 9/016 429/246 |
| 2010/0261047 | A1* | 10/2010 | Kim | H01M 2/0275 429/144 |

FOREIGN PATENT DOCUMENTS

| | | |
|---|---|---|
| JP | 2000-277062 A | 10/2000 |
| JP | 2007-018917 A | 1/2007 |
| JP | 2007-311323 A | 11/2007 |
| JP | 2010-135111 A | 6/2010 |
| JP | 2010-277925 A | 12/2010 |
| JP | 2012-174590 A | 9/2012 |

\* cited by examiner

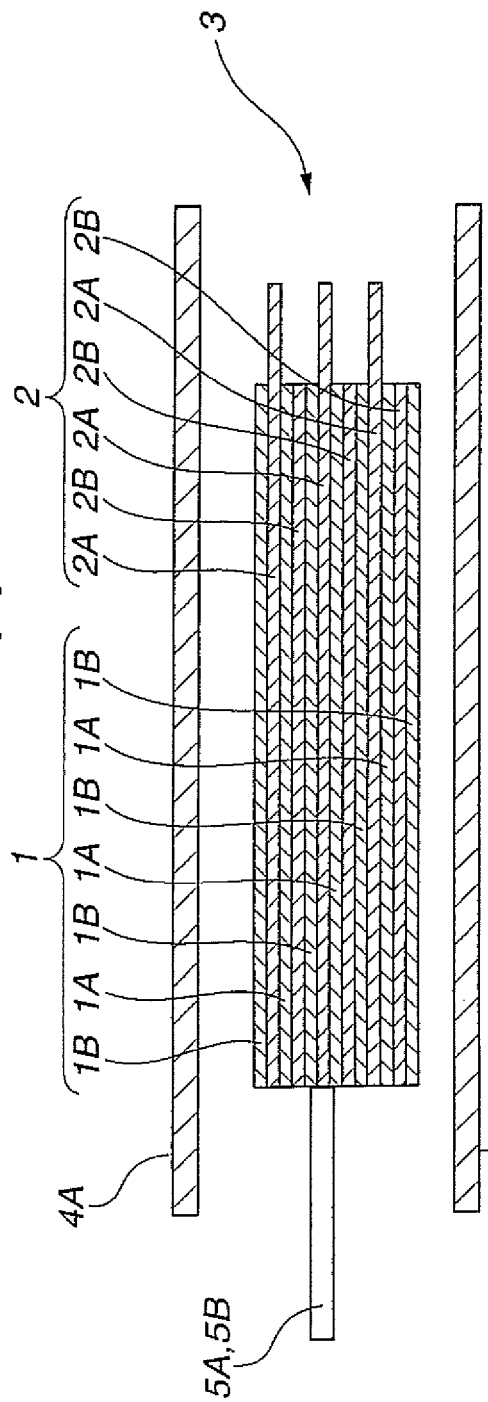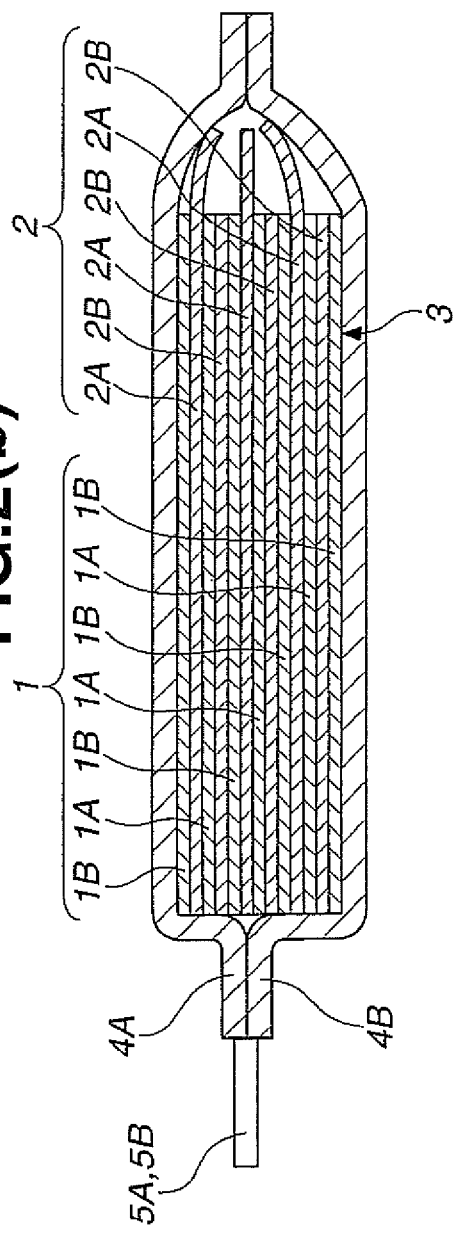

BATTERY AND METHOD FOR MANUFACTURING SAME

This is Continuation Application from International Application PCT/JP2012/075144, the International Filing Date of which is Sep. 28, 2012.

TECHNICAL FIELD

The present invention relates to a battery and a method of manufacturing the same.

BACKGROUND ART

There are batteries of a type that comprises an electrode stacked body including a plurality of electrodes and separators each being put between adjacent two of the separators, and a pair of laminate films that constitute a package to hermetically put therein the electrode stacked body. In such batteries, when the electrode stacked body is forced to move in the package of the laminate films due to a shock or the like, malfunction of the battery tends to occur. Thus, it is desirable to suppress undesirable movement of the electrode stacked body in the laminate film package.

In the technique disclosed by Patent Document 1, at least one of the separators is shaped flat and has a size larger than the other separators and electrodes that constitute the electrode stacked body, and a part of the flat and larger separator projects outward from a side of the electrode stacked body. The part of the flat and larger separator that projects outward from the electrode stacked body is put between respective peripheral portions of a pair of laminate films. That is, between the peripheral portions of the paired laminate films, there is inserted the part (or projected part) of the flat and larger separator, and at the time when the peripheral portions of the paired laminate films are joined via heat joining or the like, the projected part of the flat and larger separator, which is put between the peripheral portions of the paired laminate films, is also joined to the peripheral portions, so that the electrode stacked body is stably set in the laminate film package.

In the technique disclosed by Patent Document 2, the electrodes and separators are alternately stacked on one laminate film, and each time an electrode or separator is stacked, a tab film bonded to the electrode or separator by itself is joined to the laminate film via heat joining or the like. Finally, another laminate film is put on the stacked body, and peripheral portions of the two laminate films are joined via heat joining or the like. Also by this technique, the tab films and separators that are bonded to the electrodes are respectively joined to the paired laminate films, and thus, undesirable movement of the electrode stacked body in the passage is suppressed.

PRIOR ART DOCUMENTS

Patent Documents

Patent Document 1:
  Japanese Laid-open Patent Application (tokkai) 2007-311323
Patent Document 2:
  Japanese Laid-open Patent Application (tokkai) 2010-277925

SUMMARY OF INVENTION

In the technique disclosed by Patent Document 1, since the projected portion of at least one of separators is fixed due to joining between the peripheral portions of the laminate films placed around the projected portion, reliability of suppressing the undesirable movement of the electrode stacked body in the passage is increased. However, due to presence of the projected portion of the separators between the peripheral portions of the two laminate films, bonding between the peripheral portions tends to be lowered.

In Patent Document 2, there is no disclosure nor teaching about a case where a plurality of separators are present. Assuming a case where a plurality of separators are present, a space hermetically sealed by the laminate films has to receive therein a plurality of joined portions between the separators and the laminate films. Furthermore, in such case, for securing a joining portion for each separator to laminate films, the separators become complicated in shape. Accordingly, in case of Patent Document 2, practical usage of a plurality of separators is Accordingly, an object of the present invention is to provide a battery and a method of manufacturing the same, in which the battery employs a plurality of separators and effectively suppresses undesirable movement of an electrode stacked body in a package while preventing lowering of a sealing performance of a film-made cover member (or exterior body films).

Means for Establishing Object

A battery of the present invention comprises an electrode stacked body that includes a plurality of electrodes and a plurality of separators that are alternately stacked; and a film-made cover member that, by joining mutually overlapped peripheral portions of films, constitute a package for hermetically receiving therein the electrode stacked body, which is characterized in that the plurality of separators include separators that are flat in shape and larger in size and separators that are flat in shape and smaller in size, and the separators that are flat in shape and larger in size project outward from a side of the electrode stacked body and joined to the films of the film-made cover member at a position inside the mutually joined peripheral portions of the film-made cover member.

Advantages of Invention

In the construction of the battery, since the separators and the film-made cover member are joined, undesirable movement of the electrode stacked body in the package is suppressed, and since the flat and larger separators are joined to the film-made cover member at a position inside the mutually joined peripheral portions of the film-made cover member, the mutually joined peripheral portions of the film-made cover member have no separator therebetween and thus, lowering of sealing performance can be suppressed. Furthermore, since, although the battery has a plurality of separators, only the flat and larger separators are joined to the film-made cover member, it is possible to reduce the energy needed to carry out the joining and it is possible to reduce damages which would be applied to the joined peripheral portions of the film-made cover member.

BRIEF DESCRIPTION OF DRAWINGS

FIGS. 2(a) and 2(b) are schematically illustrated sectional views depicting a manufacturing process of the battery of FIGS. 1(a) and 1(b);

EMBODIMENTS OF INVENTION

Figure 1A:
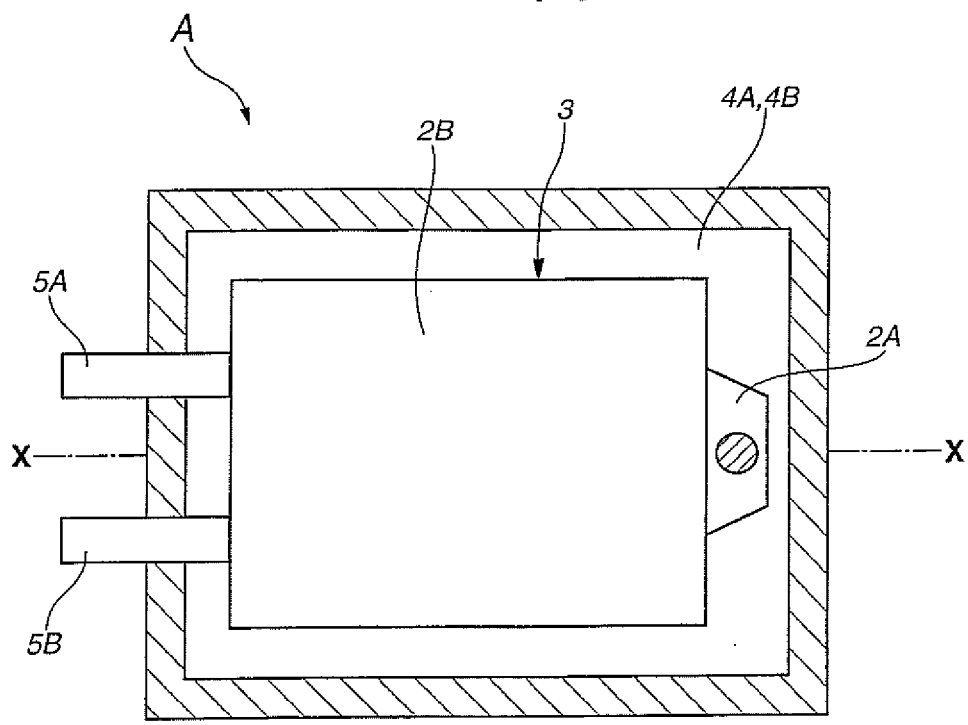
FIG. 1(*a*) is a schematically illustrated plan view of a battery of a first embodiment of the present invention with one laminate film removed, and FIG. 1(*b*) is a sectional view taken along the line X-X of FIG. 1(*a*)
Figure 1B:
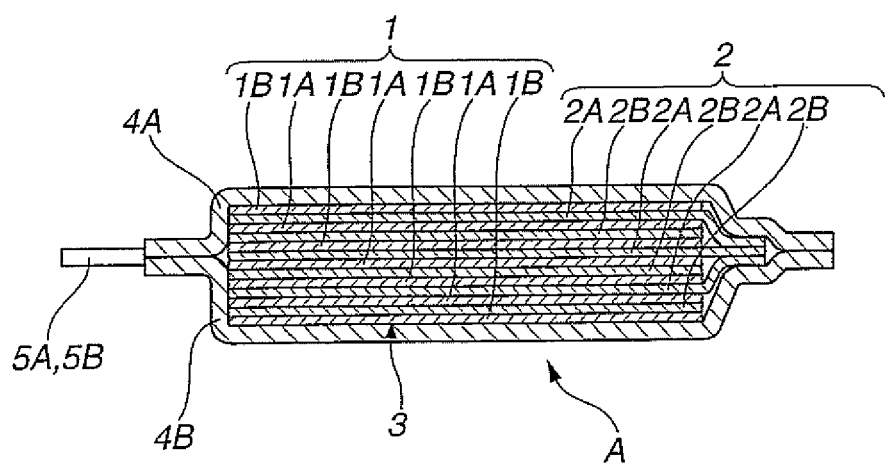

In the following, embodiments of the present invention will be described with reference to the accompanying drawings. In FIGS. 1(a) and 1(b), there is schematically shown a view of a battery of a first embodiment of the present invention. FIG. 1(a) shows a condition in which one of two laminate films is removed for clarification of the drawing.

A battery A of this embodiment is a lithium ion secondary battery which is one example. The battery has such a construction that an electrode stacked body 3, which includes a plurality of electrodes 1 and a plurality of separators 2 which are alternately stacked on one another, is hermetically received in a package that is made of a pair of mutually joined films that constitute a film-made cover member (viz., exterior body films, laminate films). More specifically, positive electrodes 1A and negative electrodes 1B are alternately stacked on one another keeping separators 2 put therebetween to constitute an electrode stacked body 3. As a material of the positive electrodes 1A, lithium-manganese oxide, lithium-nickel oxide or the like can be used. As a material of the negative electrodes 1B, graphite, amorphous carbon or the like can be used. As a material of the separators 2, a polyolefin sheet made of polypropylene or the like can be used.

The separators 2 include two types of separators, one being a larger flat type 2A and the other being a smaller flat type 2B. Specifically, as is shown in FIG. 1(b), the larger flat separators 2A and the smaller flat separators 2B are alternately stacked on one another in a direction in which the separators 2A and 2B are stacked. In this embodiment, each smaller flat separator 2B has a size larger than each of the electrodes 1A and 1B, and each larger flat separator 2A is longer in a longitudinal direction (viz., in right-left direction in FIG. 1) than each of the electrodes 1A and 1B and the smaller flat separators 2B. Accordingly, the larger flat separators 2A have portions (projected portions) that project or protrude outward from a side of the electrode stacked body 3.

One side (viz., front side in FIG. 1(a)) of the electrode stacked body 3 is covered with a laminate film 4A, and the other side (viz., back side in FIG. 1(a)) of the body 3 is covered with another laminate film 4B. These laminate films 4A and 4B have respective peripheral portions put on each other and joined with each other via heat joining or the like (the joined portion is hatched in FIG. 1(a)). As is mentioned hereinabove, a package for receiving the electrode stacked body 3 is produced by the laminate films 4A and 4B whose peripheral portions are joined. Although not shown in the drawings, electrolyte is sealed in the package. Each of the laminate films 4A and 4B includes a polyolefine resin layer such as polypropylene or the like, a metal layer and a protective layer, which are laminated in a direction from the joined part toward the outside.

A lead-out electrode 5A connected to the positive electrodes 1A and a lead-out electrode 5B connected to the negative electrodes 1B are drawn out to the outside of the package through the joined peripheral portions of the laminate films 4A and 4B.

In this embodiment, within the package, that is, at a position inside the joined peripheral portions of the laminate films 4A and 4B, the portion (projected portion) of the flat larger separators 2A, which is projected outward from the side of the electrode stacked body 3, is joined to the laminate films 4A and 4B by way of a ultrasonic welding method or the like (the joined portion is hatched in FIG. 1(a)).

In the following, a method of producing the battery A of this embodiment will be described with reference to FIGS. 2(a) and 2(b). First, as is seen from FIG. 2(a), a plurality of electrodes 1 and separators 2 are stacked on one another to produce an electrode stacked body 3. More specifically, as is mentioned hereinabove, the negative electrode 1B, the larger flat separator 2A, the positive electrode 1A and the smaller flat separator 2B are alternately put on one another in this order and the stacking work is repeated. Then, the lead-out electrode 5B is connected to the negative electrodes 1B and the lead-out electrode 5A is connected to the positive electrodes 1A. As is seen from FIG. 2(b), a laminate film 4A is placed at one side of the electrode stacked body 3 and another laminate film 4B is placed at the other side of the body 3, and then, the electrode stacked body 3 is wrapped up by the laminate films 4A and 4B. Then, respective peripheral portions of the laminate films 4A and 4B are intimately put on each other except one side through which electrolyte is poured thereinto, and then the peripheral portions are joined to each other via heat joining or the like. It is to be noted that the side through which the electrolyte is poured thereinto is a side where the larger flat separators 2A are not projected from the electrode stacked body 3. After completion of pouring of the electrolyte, joining of the remaining side is made via heat joining or the like.

Then, the laminate films 4A and 4B are brought into contact with the projected portions of the larger flat separators 2A which are placed inside the peripheral portions of the laminate films 4A and 4B when viewed planarly and projected from the side of the electrode stacked body 3, and then the laminate films 4A and 4B are joined to the projected portions by way of ultrasonic welding method. With this procedure, the laminate film 4A, the larger flat separator 2A that forms an outermost layer, the larger flat separator 2A that takes an intermediate position, the larger flat separator 2A that forms the other outermost layer and the laminate film 4B are stacked and joined. With this process, the battery A shown in FIGS. 1(a) and 1(b) is produced.

In this battery A, since the larger flat separators 2A and the laminate films 4A and 4B are joined within the package constructed by the laminate films 4A and 4B, undesirable movement of the electrode stacked body 3 is suppressed and since the separators are not present at the joined peripheral portions of the laminate films 4A and 4B, lowering of joining reliability of the peripheral portions of the laminate films 4A and 4B can be suppressed. Furthermore, even though the battery is of a type that has a plurality of separators, joining only a part of the plurality of separators, which are the larger flat separators, to the laminate films 4A and 4B can bring about reduction of energy needed for the joining as well as reduction of influence applied to the joined peripheral portions of the laminate films 4A and 4B.

In this method of producing the battery A, the joining between the peripheral portions of the laminate films 4A and 4B is made prior to joining of the larger flat separators 2A to the laminate films 4A and 4B, and thus, heat and vibration produced at the time when the separators 2A and the laminate films 4A and 4B are joined don't affect the joining between the peripheral portions of the laminate films 4A and 4B, so that a higher sealing performance is secured.

When, in the electrode stacked body 3, the larger flat separators 2A and the smaller flat separators 2B are alternately stacked in the stacking direction, every other separator 2 is joined to the laminate films 4A and 4B, and thus, suppression of the undesirable movement of the electrode stacked body 3 in the package is effectively made. If desirable, besides every other one, every two or three other one in the larger flat separators 2A may be joined to the laminate films 4A and 4B. The number of the larger flat separators 2A to be joined to the laminate films 4A and 4B may be one or more than one. If, in case of two, the outermost two of the larger flat separators 2A are joined, a space defined between the two larger flat separators 2A joined to the laminate films 4A and 4B can put therein all of the other electrodes 1 and separators 2, and thus, movement suppression to the electrode stacked body 3 in the package is made effective.

Portions of the larger flat separators 2A that are joined to the laminate films 4A and 4B may be placed everywhere except the joined peripheral portions of the laminate films 4A and 4B. If, as is seen from FIG. 1(a), the portions of the larger flat separators 2A that are joined to the laminate films 4A and 4B are placed at a position opposite to the lead-out electrodes 5A and 5B with respect to the electrode stacked body, movement suppression to the electrode stacked body 3 in the package in the same direction is effectively made.

Joining the larger flat separators 2A to the laminate films 4A and 4B may be made by any kind methods (for example, ultrasonic welding method, spot welding or the like), and it is preferable to use a method, such as the ultrasonic welding method or the like, that does not accompany heating. This is because the joining between the peripheral portions of the laminate films 4A and 4B is made very often via heat joining, in the embodiment, after joining between the peripheral portions of the laminate films 4A and 4B, joining between the larger flat separators 2A and the laminate films 4A and 4B is carried out. That is, if, due to usage of the heat joining, joining between the larger flat separators 2A and the laminate films 4A and 4B generates heat, the heat thus generated would affect the previously joined portions (portions applied with heat joining) of the peripheral portions of the laminate films 4A and 4B, which brings about a possibility of deteriorating the joining strength.

Figure 3A:
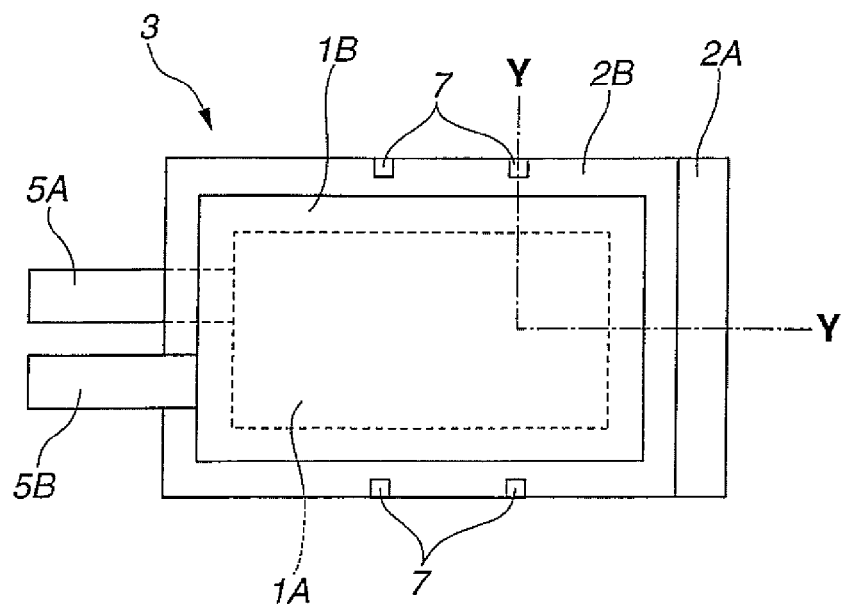
FIG. 3(a) is a schematically illustrated plan view of an electrode stacked body of a battery of a second embodiment of the present invention.
Figure 3B:
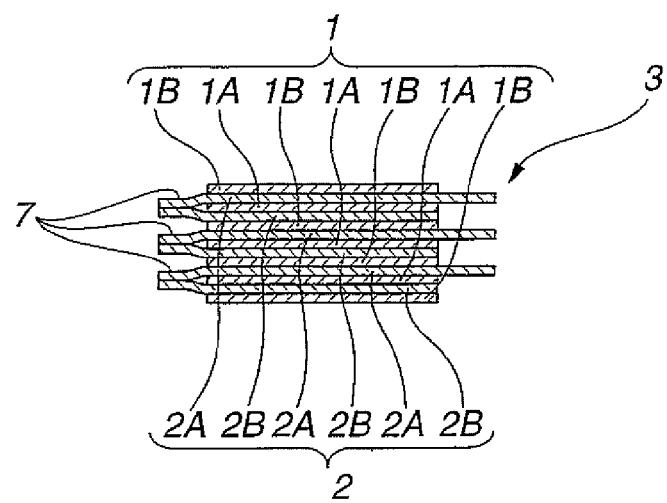
FIG. 3(b) is a sectional view taken along the line Y-Y of FIG. 3(a)
Figure 3C:
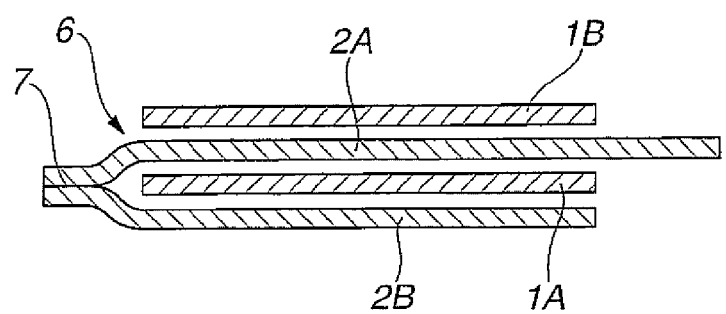
FIG. 3(c) is a schematic view of a pair of intermediate electrode layers and an electrode, which is an enlarged sectional view taken along the line Y-Y of FIG. 3(a)
Figure 4:
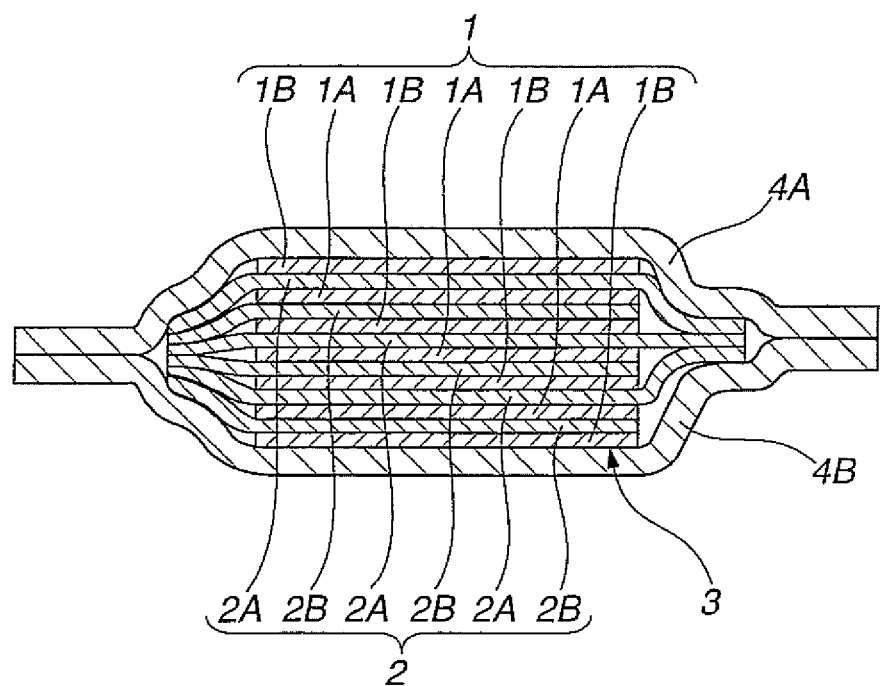
FIG. 4 is a schematic view of a battery including electrode stacked bodies each being shown by FIGS. 3(a) and 3(b), which is a sectional view taken along the line Y-Y of FIG. 3(a)
Figure 5:
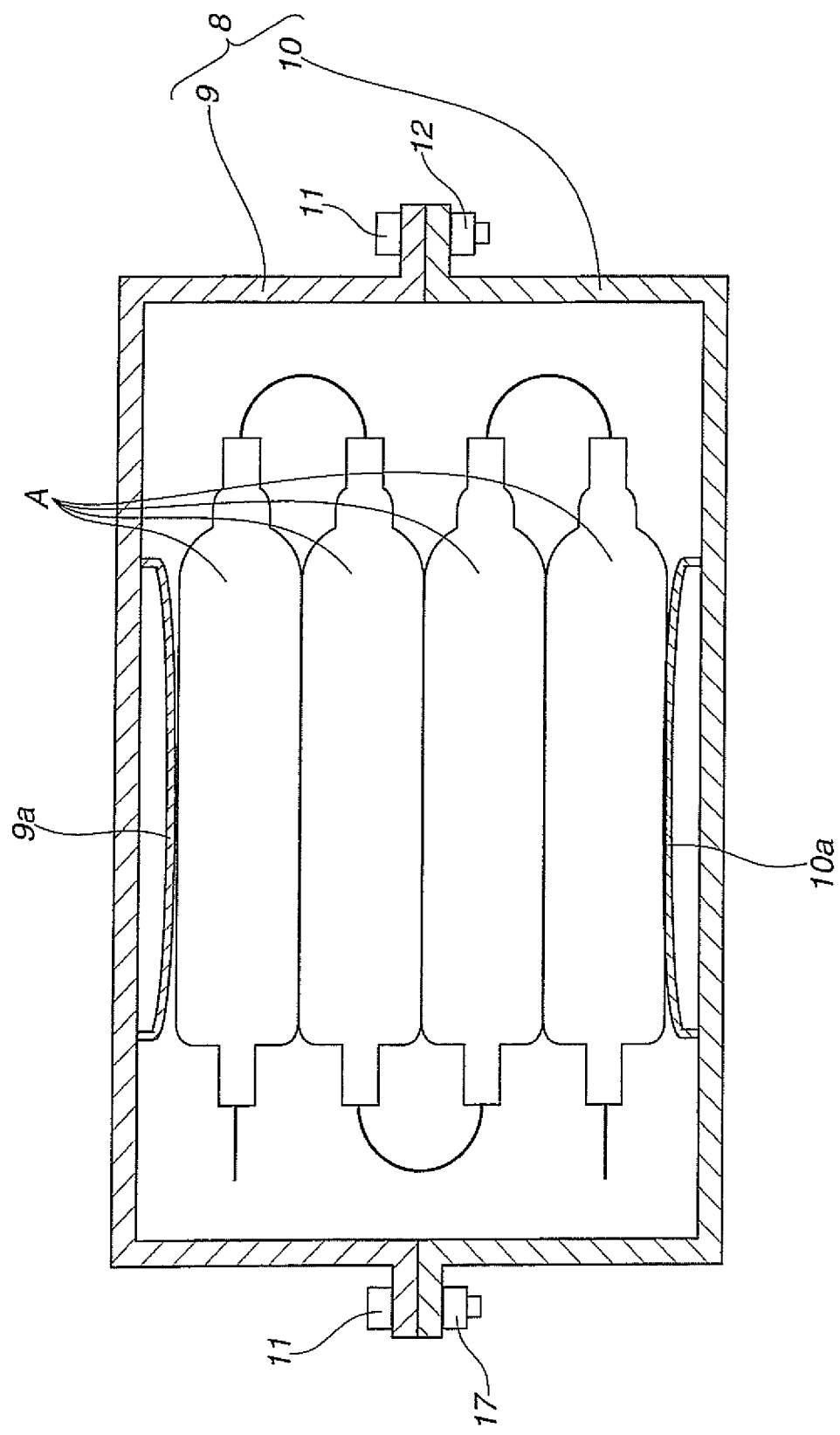
FIG. 5 is a sectional view of a battery unit of a third embodiment of the present invention.

In the following, a second embodiment of the present invention will be described. Portions that are in common with those of the first embodiment will be denoted by the same numerals and detailed explanation of the portions will be omitted. In this second embodiment, as is seen from FIGS. 3(a) to 3(c), an intermediate electrode stacked body 6 is provided, which comprises two adjacent separators 2 that are constructed so that at least one sides are not joined and the other sides are previously joined and an electrode of one pole (for example, the positive electrode 1A) that is put between the two adjacent separators 2. By the mutual stacking between the intermediate electrode stacked body 6 and a second pole (for example, the negative electrode 1B), an electrode stacked body 3 is produced. As is seen from FIG. 4, like in the first embodiment, first, the peripheral portions of the laminate films 4A and 4B are joined to each other with the electrode stacked body 3 kept put between the laminate films 4A and 4B, and thereafter, the larger flat separators 2A in the electrode stacked body 3 are joined to the laminate films 4A and 4B.

More specifically, in this embodiment, the larger flat separators 2A and the smaller flat separators 2B are so joined by heat joining at four joining points 7 that include two joining points provided in one side perpendicular to a side where the lead-out electrodes 5A and 5B are positioned and two joining points provided in the other side perpendicular to the side where the lead-out electrodes 5A and 5B are positioned. With such joining points, the two separators 2A and 2B are joined to constitute a bag-shaped construction. And, between the two separators 2A and 2B that are joined to constitute the bag-shaped construction, there is disposed the positive electrode 1A. With this arrangement, the intermediate electrode stacked body 6 (see FIG. 3(c)) is provided. Furthermore, as is seen from FIGS. 3(a) and 3(b), a plurality of intermediate electrode stacked bodies 6 and a plurality of negative electrodes 1B are alternately stacked on one another to constitute the electrode stacked body 3. Thereafter, as is seen from FIG. 4, joining of the peripheral portions of the laminate films 4A and 4B and joining between the larger flat separators 2A and the laminate films 4A and 4B are carried out in the same manner as in the first embodiment.

In this second embodiment, in addition to the effects expected from the first embodiment, the following effect is obtained. That is, when the electrode stacked body 3 is applied with a force, the joining between the separators 2A and the laminate films 4A and 4B forces the separators 2A to be pulled and the separators 2B joined to the separators 2A to be also pulled, which is effective to suppress the undesirable movement of the electrode stacked body 3 in the package.

A third embodiment of the present invention will be described in the following. In this embodiment, a plurality of batteries A each being the same as that of the above-mentioned first or second embodiment are stacked and put in a case 8 to produce a battery unit. The case 8 of this embodiment comprises upper and lower cases 9 and 10 that are respectively provided with pressing portions 9a and 10a to resiliently press the stacked batteries A. The upper and lower cases 9 and 10 are connected to each other through connecting members (for example, bolts 11 and nuts 12). Accordingly, in this embodiment, each of the batteries A is held while being pressed. The pressing force serves as a force for suppressing undesirable movement of the electrode stacked body 3 in the package of each battery A. Accordingly, the effect of suppressing or preventing the movement of the electrode stacked body 3 is further increased.

In the above-mentioned two embodiments, explanation is directed to the package of the type that is produced by joining two laminate films. However, if desired, a package of another type may be used in which one laminate film is bent at one side and peripheral portions of the bent film are entirely joined. The type of the battery is not limited to the lithium ion secondary battery so long as the passage is made of a film or films.

The contents of PCT/JP2012/075144 filed Sep. 28, 2012 are incorporated herein by reference.

Although the invention has been described above with reference to the embodiments of the invention, the invention is not limited to such embodiments as described hereinabove. Various modifications and variations of such embodiments may be carried out by those skilled in the art, in light of the above description.

What is claimed is:

1. A battery comprising:
an electrode stacked body that includes a plurality of electrodes and a plurality of separators, wherein each of the plurality of separators is disposed between an adjacent two of the plurality of electrodes such that the plurality of electrodes and the plurality of separators are alternately stacked relative to one another; and
a film-made cover member that, by joining mutually overlapped peripheral portions of one or more films, constitutes a package for hermetically receiving therein the electrode stacked body,
wherein the plurality of separators includes first separators and second separators that are flat in shape,
wherein the first separators are larger in size than the second separators,
wherein disposed between an adjacent two of the first separators are at least two of the plurality of electrodes and at least one of the second separators, and
wherein the first separators project outward from a side of the electrode stacked body and are joined to the one or more films of the film-made cover member at a first position different from a second position at which the peripheral portions of the mutually overlapped peripheral portions of the one or more films of the film-made cover member are joined, the first position being within an interior of the film-made cover member.

2. A battery as claimed in claim 1, in which the first separators and the second separators are alternately put on one another in a direction in which the plurality of separators are stacked.

3. A battery as claimed in claim 1, in which the peripheral portions of the one or more films of the film-made cover member are heat joined to each other and the first separators are bonded to the one or more films of the film-made cover member through an ultrasonic welding method.

4. A battery as claimed in claim 1, in which adjacent two of the plurality of separators are at least partially joined on at least one side and one of paired electrodes is put between the two separators that are joined.

5. A battery unit including a battery as defined by claim 1, comprising:
a plurality of the batteries that are stacked; and
a housing that houses therein the batteries while pressing the batteries in a direction in which the batteries are stacked.

6. A method of producing a battery comprising:
enclosing an electrode stacked body with a film-made cover member, the electrode stacked body comprising a plurality of separators, which include first separators and second separators that are flat in shape, the first separators being larger in size than the second separators, and a plurality of electrodes, wherein each of the plurality of separators is disposed between an adjacent two of the plurality of electrodes such that the plurality of electrodes and the plurality of separators are alternately stacked relative to one another, and wherein disposed between an adjacent two of the first separators are at least two of the plurality of electrodes and at least one of the second separators;
producing a package for hermetically receiving therein the electrode stacked body by joining peripheral portions of one or more films of the film-made cover member that covers the electrode stacked body to one another; and
after the step of joining the peripheral portions of the one or more films of the film-made cover member to one another, joining the first separators to the one or more films of the film-made cover member at a side of the electrode stacked body at a first position different from a second position at which the peripheral portions of the one or more films of the film-made cover member are joined, the first position being within an interior of the film-made cover member.

7. A method of producing a battery as claimed in claim 6, in which the step of producing the package for hermetically receiving therein the electrode stacked body includes a step of heat joining the peripheral portions of the one or more films of the film-made cover member, and the step of joining the first separators to the one or more films of the film-made cover member includes a step of joining the first separators to the one or more films of the film-made cover member through ultrasonic welding.

8. A battery as claimed in claim 1, in which a space is provided between the first position where the first separators are joined to the one or more films of the film-made cover member and the second position where the peripheral portions of the one or more films of the film-made cover member are joined to each other.

9. A battery as claimed in claim 8, in which each of the plurality of electrodes is sandwiched between adjacent two of the separators, the first separators are arranged equally spaced in a lamination direction of the electrode stacked body and peripheral portions of outermost two of the first separators are joined to each other.

10. A battery as claimed in claim 1, wherein the second separators are not joined to the one or more films of the film-made cover member.

11. A battery as claimed in claim 1, wherein the plurality of electrodes and the plurality of separators are alternately stacked relative to one another such that each of an adjacent two of the plurality of separators includes at least one of the plurality of electrodes disposed therebetween.

12. A method of producing a battery as claimed in claim 6, wherein the plurality of electrodes and the plurality of separators are alternately stacked relative to one another such that each of an adjacent two of the plurality of separators includes at least one of the plurality of electrodes disposed therebetween.

* * * * *